United States Patent [19]
Fraiman

[11] Patent Number: 5,782,139
[45] Date of Patent: Jul. 21, 1998

[54] BICYCLE HANDLEBAR CENTERPIECE

[76] Inventor: Peter G. Fraiman, 18705 S.E. 284th Pl., Kent, Wash. 98042

[21] Appl. No.: 789,736

[22] Filed: Jan. 27, 1997

Related U.S. Application Data

[63] Continuation of Ser. No. 524,216, Sep. 6, 1995, abandoned.
[51] Int. Cl.$^6$ ..................................................... B62K 21/12
[52] U.S. Cl. ..................................................... 74/551.1
[58] Field of Search ........................ 74/551.1, 551.8, 74/551.9; D12/178, 111; 280/281.1

[56] References Cited

U.S. PATENT DOCUMENTS

| | | | |
|---|---|---|---|
| D. 98,651 | 2/1936 | Kraeft | D12/178 |
| D. 179,273 | 11/1956 | Stevens | 74/551.1 X |
| D. 214,114 | 5/1969 | Clarke | D12/178 |
| D. 273,775 | 5/1984 | Aker et al. | |
| D. 301,027 | 5/1989 | Borromeo | 74/551.1 X |
| D. 372,893 | 8/1996 | Harris | D12/178 |
| 2,004,089 | 6/1935 | Anderson | 74/551.1 |
| 2,034,934 | 3/1936 | Anderson | 74/551.8 |
| 2,114,733 | 4/1938 | Anderson | 74/551.1 |
| 2,143,234 | 1/1939 | Anderson | 74/551.1 |
| 3,834,249 | 9/1974 | Bothwell | 74/551.9 X |
| 4,917,397 | 4/1990 | Chonan | 74/551.1 |
| 5,163,339 | 11/1992 | Giard, Jr. et al. | 74/551.8 X |
| 5,221,102 | 6/1993 | Spangler | 280/281.1 |
| 5,257,552 | 11/1993 | Boyer et al. | 74/551.1 |
| 5,269,196 | 12/1993 | Rafac | 74/551.1 |
| 5,275,067 | 1/1994 | Lew | 280/281.1 X |

FOREIGN PATENT DOCUMENTS

| | | | |
|---|---|---|---|
| 2550154 | 2/1985 | France | 280/281.1 |
| 2 654 698 | 5/1991 | France | 74/551.1 |
| 2224253 | 5/1990 | United Kingdom | 280/281.1 |

*Primary Examiner*—Rodney H. Bonck
*Assistant Examiner*—Mary Ann Battista
*Attorney, Agent, or Firm*—Ostrolenk, Faber, Gerb & Soffen, LLP

[57] ABSTRACT

A centerpiece for a handlebar of a bicycle having left and right wing-shaped handlebar sections. The centerpiece has left and right lugs having a wing-shaped cross-section. The wing-shaped handlebar sections are secured to the lugs. Aerobar supports with threaded arm rest mounts also can be provided integrally with the centerpiece.

46 Claims, 8 Drawing Sheets

BICYCLE HANDLEBAR CENTERPIECE

This is a continuation of application Ser. No. 08/524,216 filed on Sep. 6, 1995 now abandoned.

BACKGROUND OF THE INVENTION

1. Field of the Invention

The present invention relates to bicycles. More specifically, the present invention relates to the centerpiece supporting the handlebars of a bicycle.

2. Description of the Related Art

Conventional handlebars for bicycles are made from round tubing. These known handlebars are generally a single tube that connects to the front fork of the bicycle by way of a steering post or stem which clamps around a central portion of the handlebar.

Tubular handlebars are not aerodynamically optimal. For competitive racing, bicycles need to be as aerodynamic as possible. The handlebars are generally one of the first components of the bicycle to confront the air through which the bicycle must travel. Accordingly, improvements in the aerodynamics of a bicycle's handlebars can have a dramatic effect on the overall aerodynamics of the bicycle.

A centerpiece for a two-piece handlebar is disclosed in U.S. Pat. No. 637,517. The handle bar has an adjustable angle, is made of conventional tubing, and provides no aerodynamic advantage.

SUMMARY OF THE INVENTION

The present invention overcomes the disadvantages of the prior art noted above by providing an aerodynamic handlebar centerpiece. The centerpiece accommodates handlebars having wing-shaped handlebar sections. In a preferred embodiment, the two handlebar sections are separate, and are connected centrally by the aerodynamically-shaped centerpiece. The centerpiece preferably has left and right lugs, each lug having a wing-shaped cross-section for receiving the ends of the left and right wing-shaped handlebar sections.

The centerpiece includes a stem extension. Preferably, the stem extension is a single, fixed, unitary extension of the centerpiece extending parallel to the ground. The stem extension also can extend at an upward or downward slope with respect to the ground. In an alternative embodiment, the stem extension comprises two or more extensions or tubes. Optionally, the stem extension is pivotally mounted and/or torsionally suspended on the centerpiece, a steering post, or a stem. The lugs extend from either side of the stem extension.

Preferably, the left and right lugs slope upward or downward from a horizontal through the stem extension. Most preferably, the lugs slope downward at a predetermined drop angle. The drop angle is provided to promote a flat-backed, aerodynamic position for the bicycle rider. Generally, the lugs of the bicycle handlebar centerpiece will drop at an angle which is 0°–45° from horizontal, preferably about 22.5°. On bicycles in which the front wheel, fork, and/or head tube configuration already provide a low, aerodynamic position for the rider, the left and right lugs are provided at a flat, or upward sloping orientation.

In addition, the left and right lugs preferably extend at an angle with respect to a vertical plane across the face of the bicycle rider. Most preferably, the lugs rake forward to provide the rider with a forward reach. The forward raking angle most preferably is less than 45°.

The lugs generally extend approximately three to four inches from either side of the axial center of the stem extension. In addition, each of the left and right lugs preferably tapers from a maximum outside dimension adjacent the stem extension, to a minimum outside dimension at a point furthest from the stem extension.

In a preferred embodiment, the left and right lugs are hollow, and the outer walls of the hollow lugs have a thickness that tapers, from a maximum adjacent the stem extension, to a minimum at a point furthest from the stem extension. The taper minimizes stress risers, and provides an aesthetic blending and a continued aerodynamic contour between the centerpiece and the handlebar sections.

The centerpiece of the present invention preferably is unitary. The centerpiece can be made conventionally from steel, cro-moly, or aluminum. Alternatively, the centerpiece can be made from more exotic materials such as metal matrices, boralyn, metal/carbon fibers, such as titanium carbon fibers, or beryllium. The finish can be of any conventional type, including painted, powder-coated, anodized or polished. The centerpiece can be formed by conventional, known methods, including machining, casting, forging, and molding.

The centerpiece attaches to the steering post or stem of the bicycle, using, for example, a bracket that clamps around the post or stem. Alternatively, the centerpiece can be attached using a quill. Other mounting systems can be utilized as well, such as pivot heads, and shock-absorbing systems. In addition, the centerpiece and stem can be formed as a unitary piece.

In an alternative embodiment, the centerpiece of the present invention incorporates integral aerobar supports to which an aerobar can be attached. Also, built-in mounts are provided on the aerobar supports, for example, to mount arm rest pads. Preferably, the mounts have screw threads receiving mounting bolts or screws.

Advantageously, cable openings are provided in the centerpiece. Accordingly, brake or shifter cables, for example, hidden inside the handlebars, can emerge at the centerpiece, providing further aerodynamic advantages.

A bicycle handlebar using the centerpiece, according to the present invention, can be made in various styles; thus, aeroflow handlebars that can be assembled according to the present invention include, for example, sprint bars, road bars, time trial bars, and endurance bars. Advantageously, the flat, aeroflow bars provide a wide surface on which the rider's hands can rest and which can be used to pull back on, for example, in a hill climbing position. The handlebars further provide a gripping surface that is comfortable and more ergonomic than a simple tube.

In addition, the invention includes a bicycle or other similar vehicle made with the handlebar centerpiece of the present invention. Many types of bicycles can be manufactured using the centerpiece of the present invention, including time-trial bicycles, sprint bicycles, and road bicycles.

Further enhancements to the centerpiece include mounting capabilities for computers and lights.

Other features and advantages of the present invention will become apparent from the following description of the embodiments of the invention which refers to the accompanying drawings.

DETAILED DESCRIPTION OF THE PREFERRED EMBODIMENTS

Figure 1:
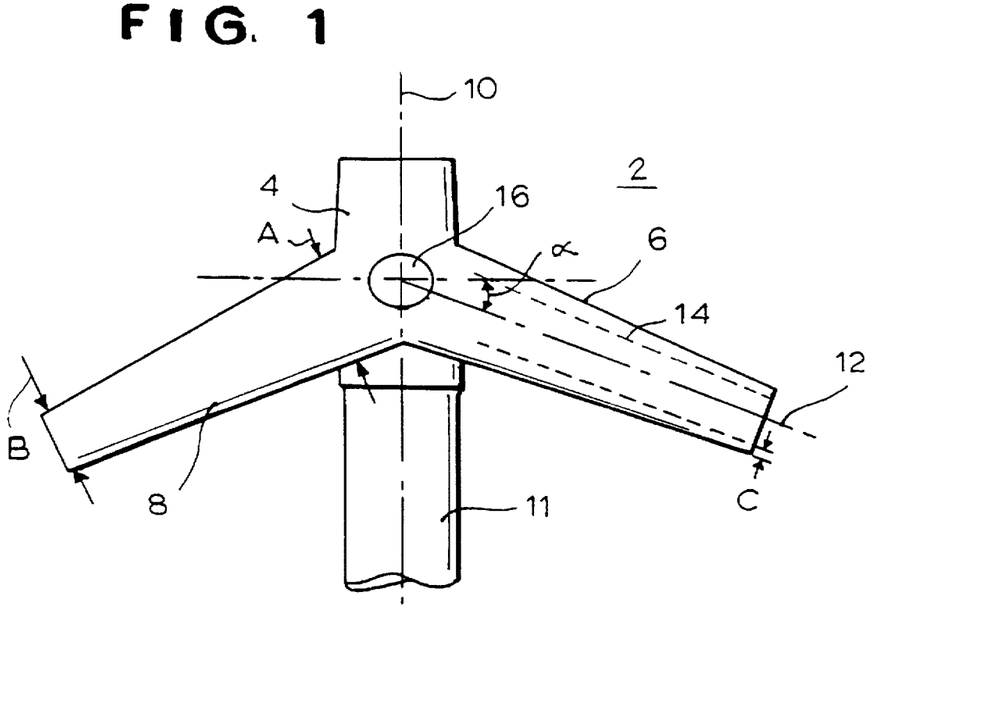
FIG. 1 is a front elevation of a preferred handlebar centerpiece according to the present invention.

Referring to FIG. 1, a front view of the centerpiece 2 according to a preferred embodiment of the present invention is shown. A stem extension 4 has extending from either side thereof a left lug 6 and a right lug 8. Stem extension 4 has a central axis 10. Stem extension 4 connects to or is integral with a quill or stem 11, shown partially in FIG. 1.

A drop angle $\alpha$ is measured with respect to the horizontal and a central left lug axis 12 of left lug 6. The drop angle can vary from above the horizontal (negative drop) to approximately 45°. Preferably, the drop angle $\alpha$ is approximately 22.5°. Centerpiece 2 is symmetrical about a vertical plane containing central axis 10.

Left lug 6 and right lug 8 are both hollow, and extend out from the center, preferably 3–4", depending on the strength of the materials being used for the centerpiece and the handlebars, and the degree of support and strength necessary, based on the materials used and the application to which the bicycle will be applied.

The outside of lugs 6, 8 tapers from a maximum width A nearest stem extension 4 to a minimum width B at the end of each lug. A central bore 14 of lug 6 is substantially straight, and has no taper. Accordingly, a thickness C of the lugs tapers from a maximum toward the stem extension, to a minimum thickness at the end. Right lug 8 has an identical, central bore.

Stem extension 4 ends toward its forward end in a flat 16. Flat 16 can support a logo which is either formed integrally with the flat, or attached subsequently.

Figure 2:
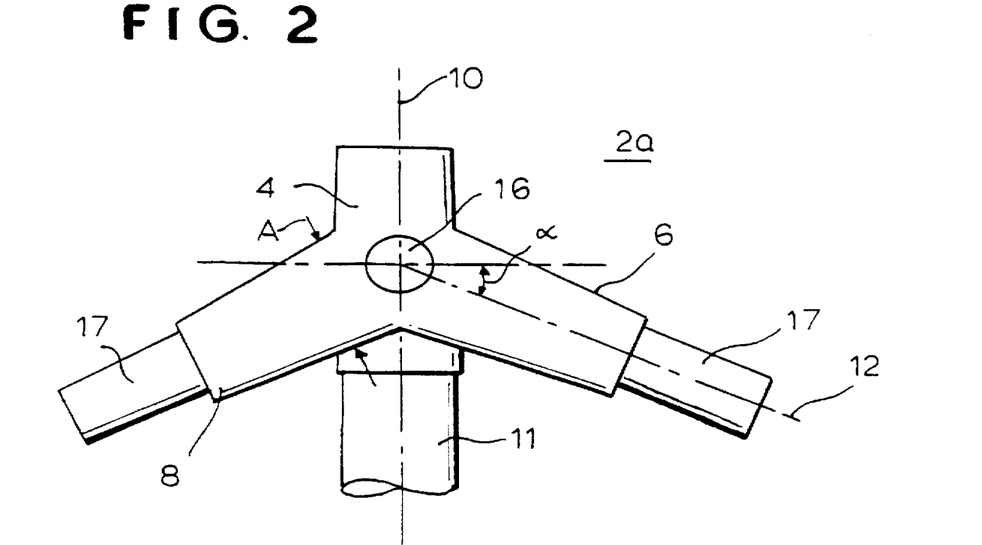
FIG. 2 is a front elevation of an alternative embodiment of a handlebar centerpiece according to the present invention.

Referring to FIG. 2, a front view of an alternative embodiment of a centerpiece 2a according to the present invention is shown. Left lug 6 and right lug 8 extending from either side of stem extension 4 are solid, or substantially solid, and have sections 17 having a reduced diameter. Sections 17 are provided to receive, for example, hollow handlebars introduced over the reduced diameter sections 17.

Figures 3, 4:
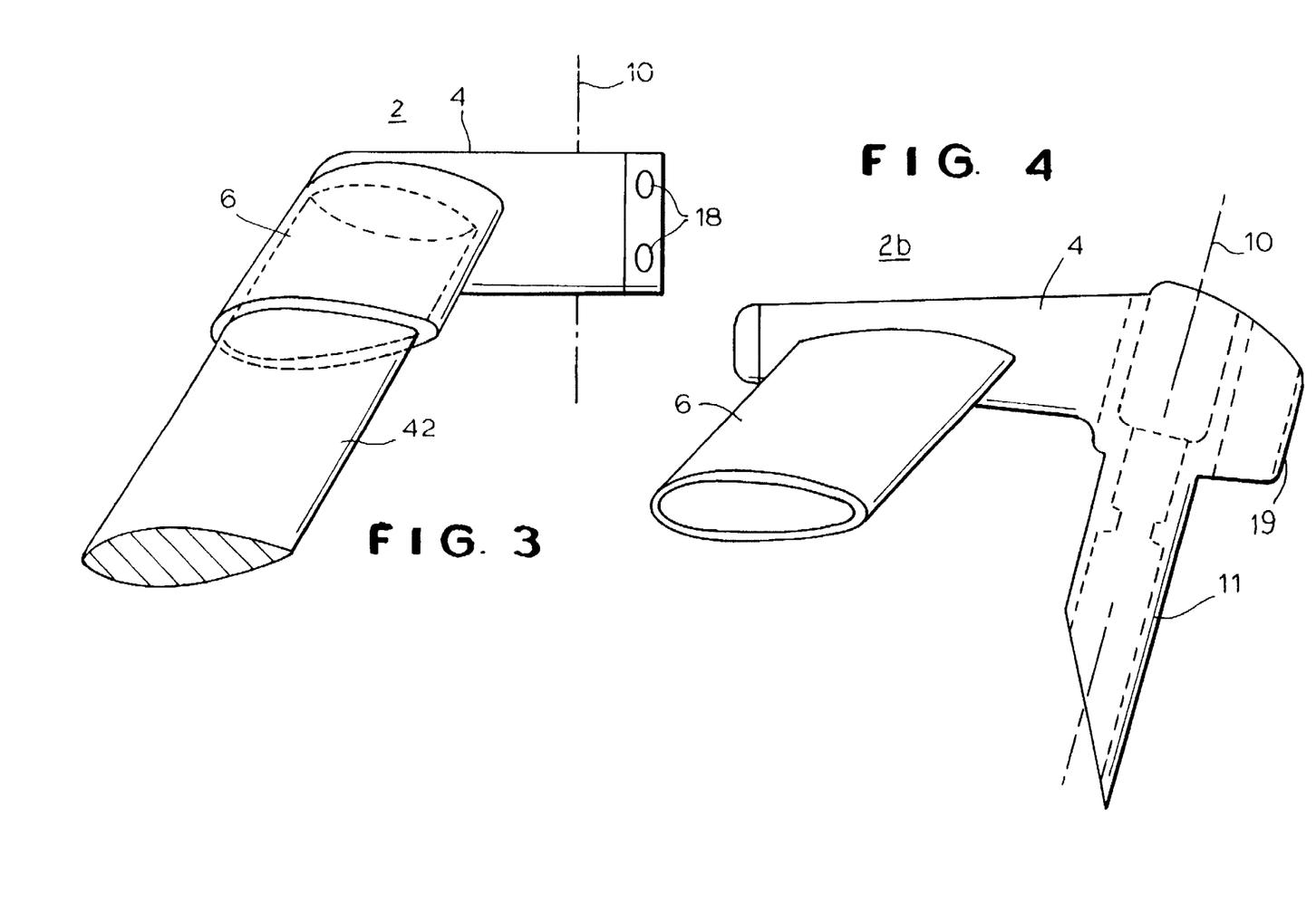
FIG. 3 is a left-side elevation of a preferred centerpiece according to the present invention.
FIG. 4 is a left-side elevation of an alternative embodiment of a centerpiece according to the present invention.

Referring to FIG. 3, centerpiece 2 is shown in elevational view from the left side. The aeroflow shape of the cross-section of lug 6 can easily be seen, the shape of hollow lug 6 accommodating the left-hand portion of an aeroflow handlebar to be inserted therein.

Centerpiece 2 is shown with a clamp-on type connection for a stem (not shown). The centerpiece is clamped to the stem by tightening allen screws 18.

Figure 6:
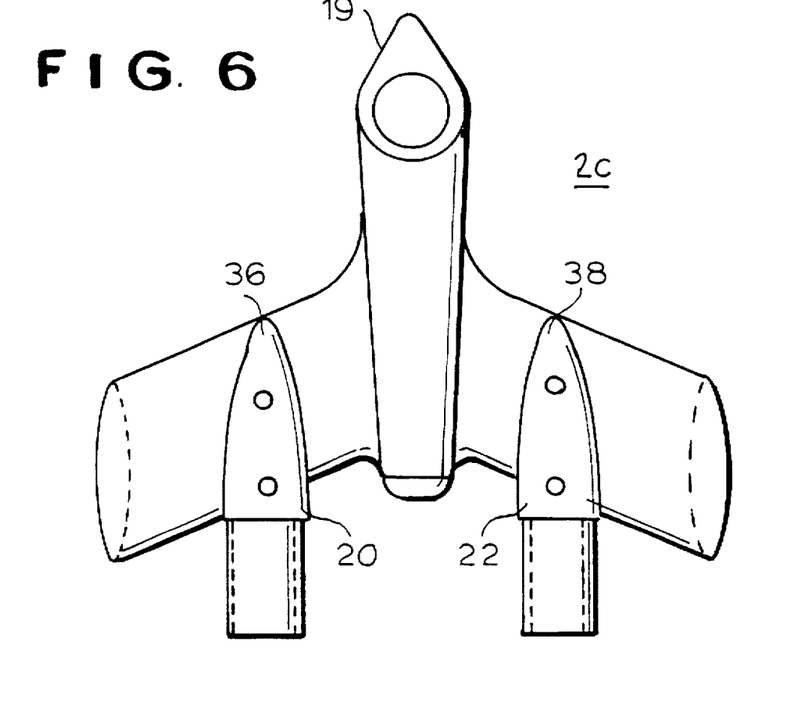
FIG. 6 is a top plan view of an alternative embodiment of a centerpiece according to the present invention including a quill stem.
Figure 7:
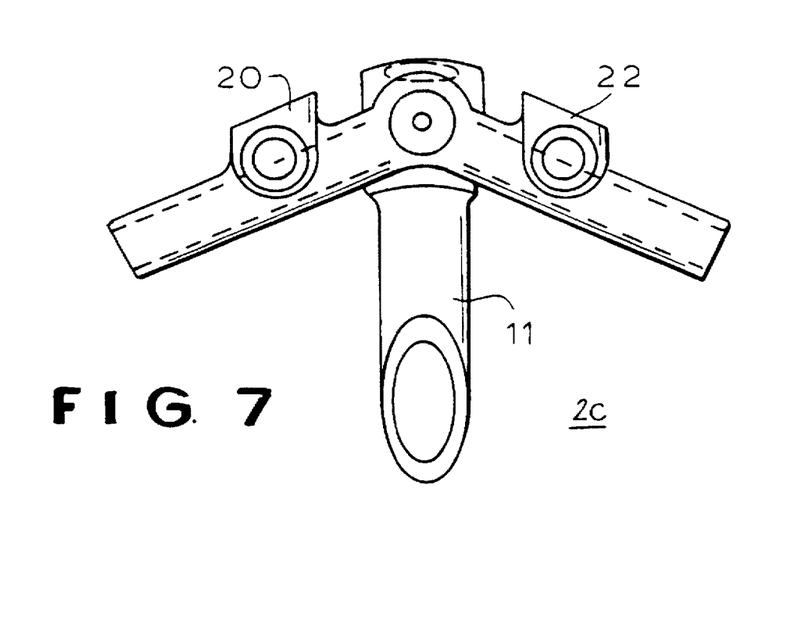
FIG. 7 is a front elevation view of the alternative embodiment shown in FIG. 6.
Figure 8:
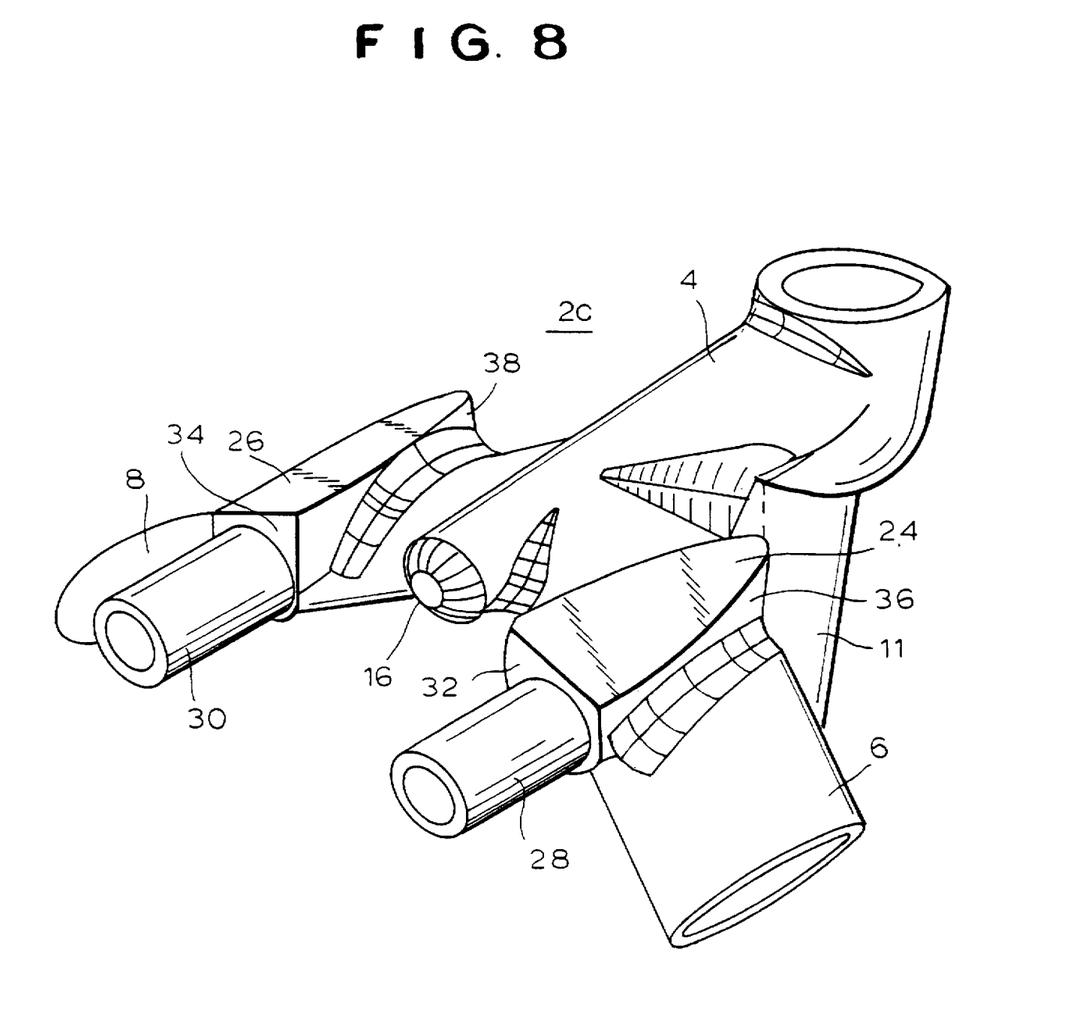
FIG. 8 is a perspective view of the alternative embodiment shown in FIGS. 6 and 7.

An alternative embodiment 2b shown in FIG. 4 includes quill 11 for mounting the centerpiece to the bicycle. Trailing end 19 is tapered at the top and bottom, and on the sides (as shown in FIG. 6), to provide an airfoil further increasing the aerodynamic advantage of the centerpiece.

Figure 5:
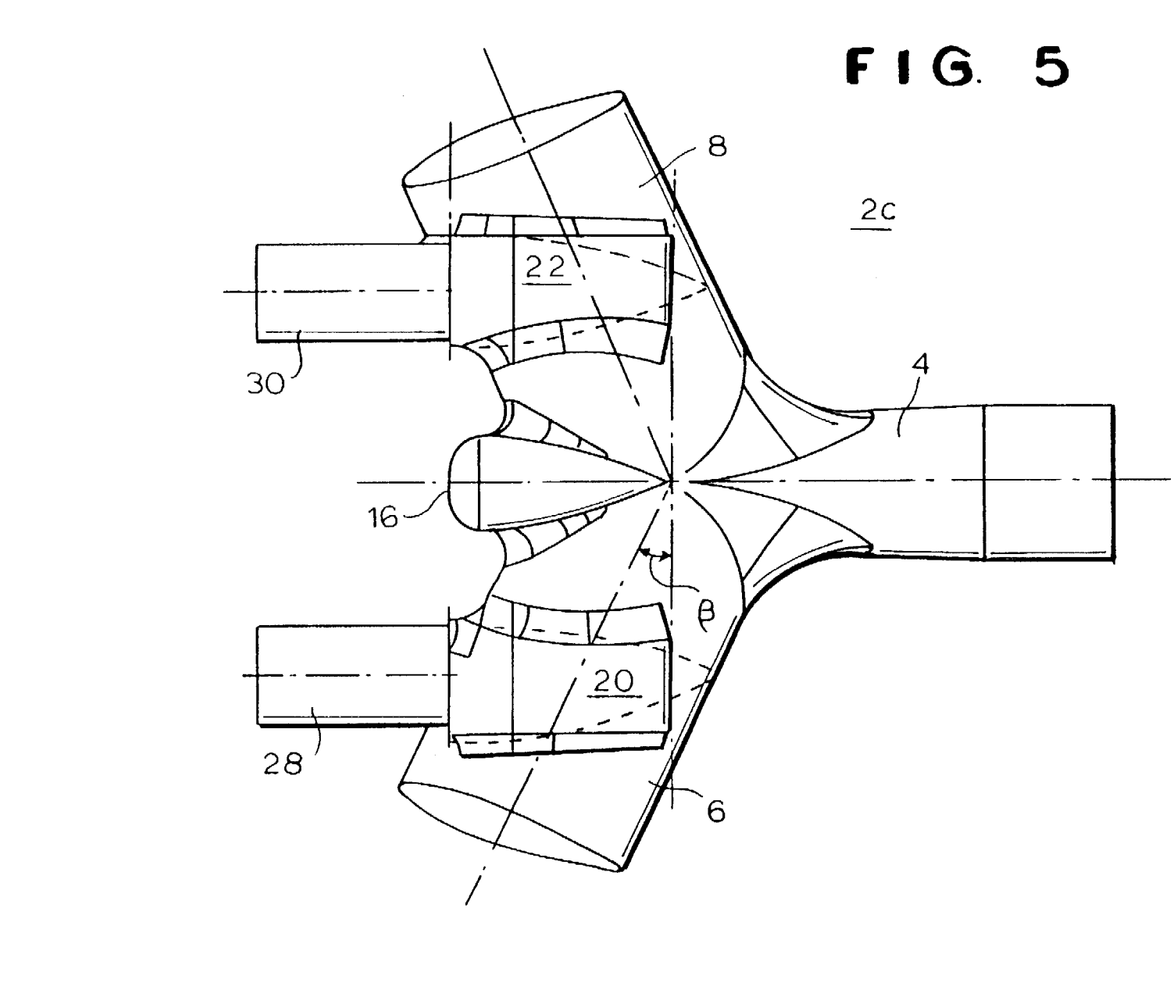
FIG. 5 is a top plan view of an alternative embodiment of a centerpiece according to the present invention including integral aerobar supports.

Referring to FIGS. 5–8, another alternative embodiment of the present invention 2c is shown having left and right integral aerobar supports 20, 22. Aerobar supports 20, 22 include respective lug extensions 24, 26 and corresponding aerobar inserts 28, 30. The lug extensions and aerobar inserts also are hollow, the inserts 28, 30 being open at their forward ends. The forward ends 32, 34 of lug extensions 24, 26 preferably are shaped to receive aerobars inserted over inserts 28, 30 such that a smooth transition is made between the outside surfaces of the aerobars and the centerpiece. The smooth transition provides increased comfort for the rider, as well as an improved aerodynamic effect. Lug extensions 24, 26 preferably taper to a rounded or aerodynamically-tapered point at trailing ends 36, 38, thereby reducing drag. Referring to FIG. 5, left lug 6 forms a forward sweep angle $\beta$ with a transverse axis through the bicycle frame.

Figure 9:
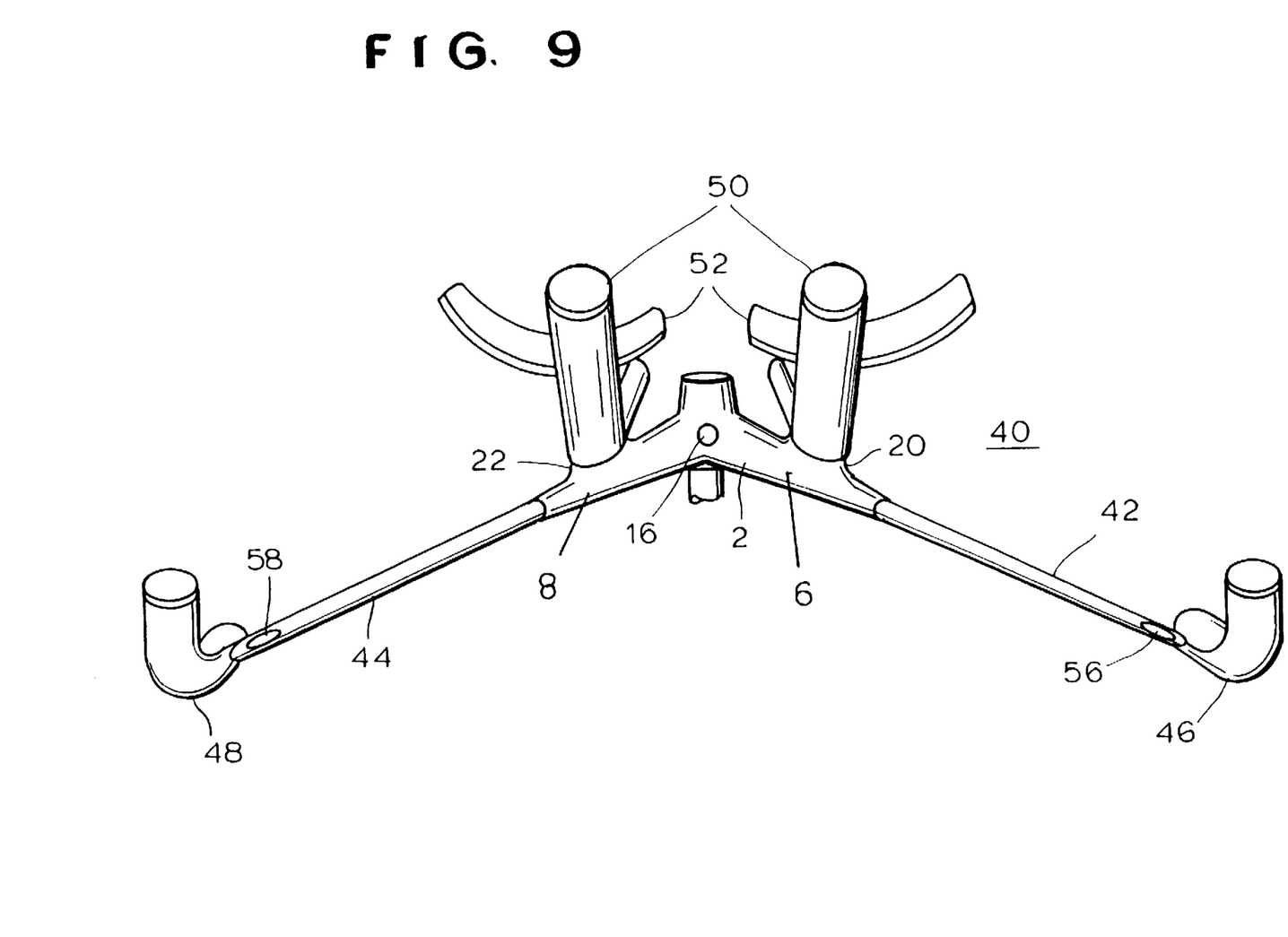
FIG. 9 is a front perspective view of a bicycle handlebar made with the centerpiece according to the present invention.

FIG. 9 shows a preferred aeroflow handlebar 40 assembled according to the present invention. Handlebar 40 has left bar 42 and right bar 44 inserted into and extending from lugs 6 and 8, respectively. Bars 42, 44 are secured within the central bore of lugs 6, 8, preferably utilizing an industrial adhesive appropriate to the materials used.

Bars 42, 44 support left and right handles 46, 48. Aerobars 50 with arm supports 52 are secured to centerpiece 2 at aerobar attachments 20, 22, as described above. Bars 42, 44 also include brake cable openings 56, 58 for brake cable routing inside handlebar 40.

Figure 10:
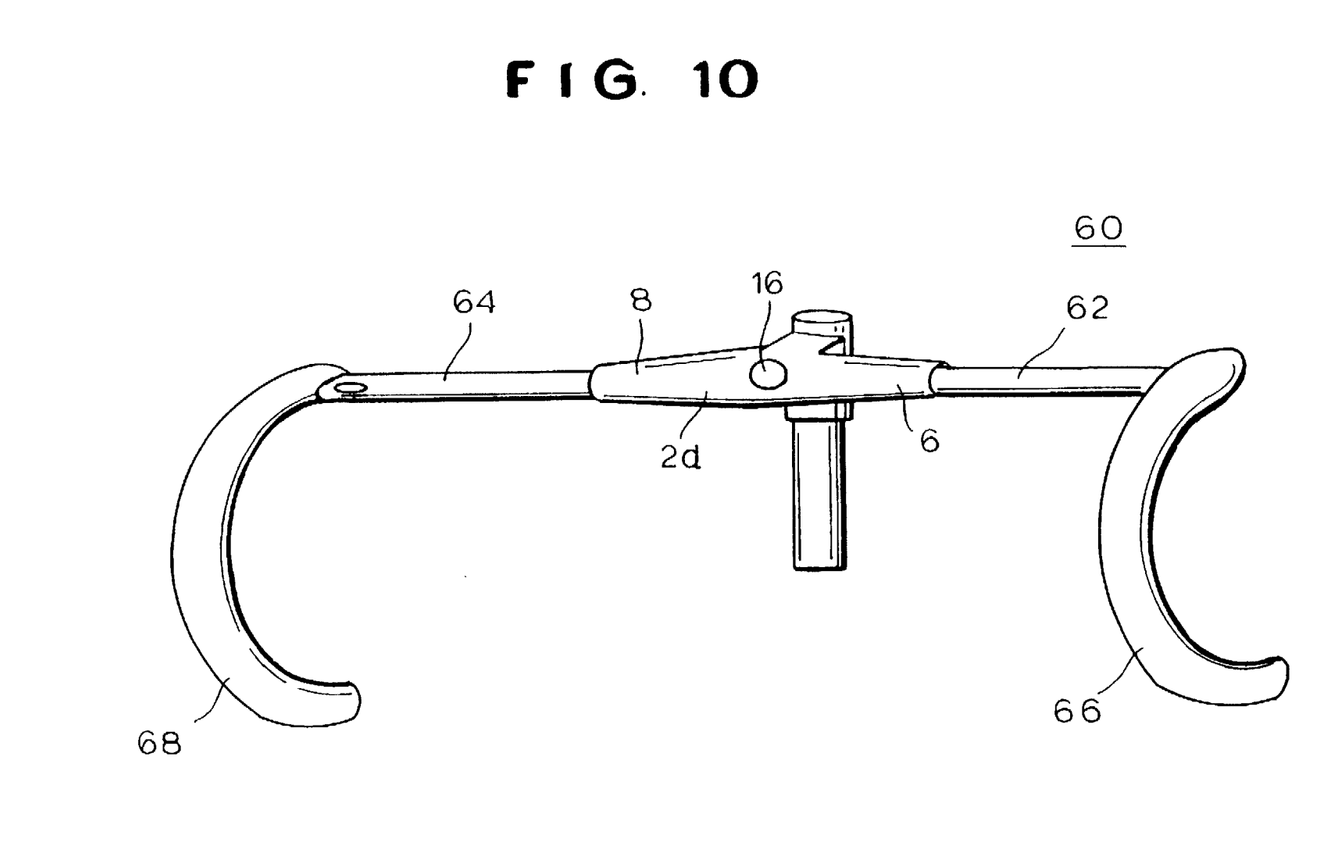
FIG. 10 is a front perspective view of an alternative handlebar made with the centerpiece according to the present invention.

FIG. 10 shows an alternative aeroflow handlebar 60 using the centerpiece of the present invention. Alternative handlebar 60 utilizes centerpiece 2d having minimal or no drop angle $\alpha$. Handlebar 60 has left bar 62 and right bar 64 inserted and secured into and extending from lugs 6 and 8, respectively. Again, bars 62, 64 preferably are secured within the central bore of lugs 6, 8, utilizing an industrial adhesive appropriate to the materials used.

Bars 62, 64 support left and right drop handles 66, 68. Bars 62, 64 also include brake cable openings similar to those noted above.

Figure 11:
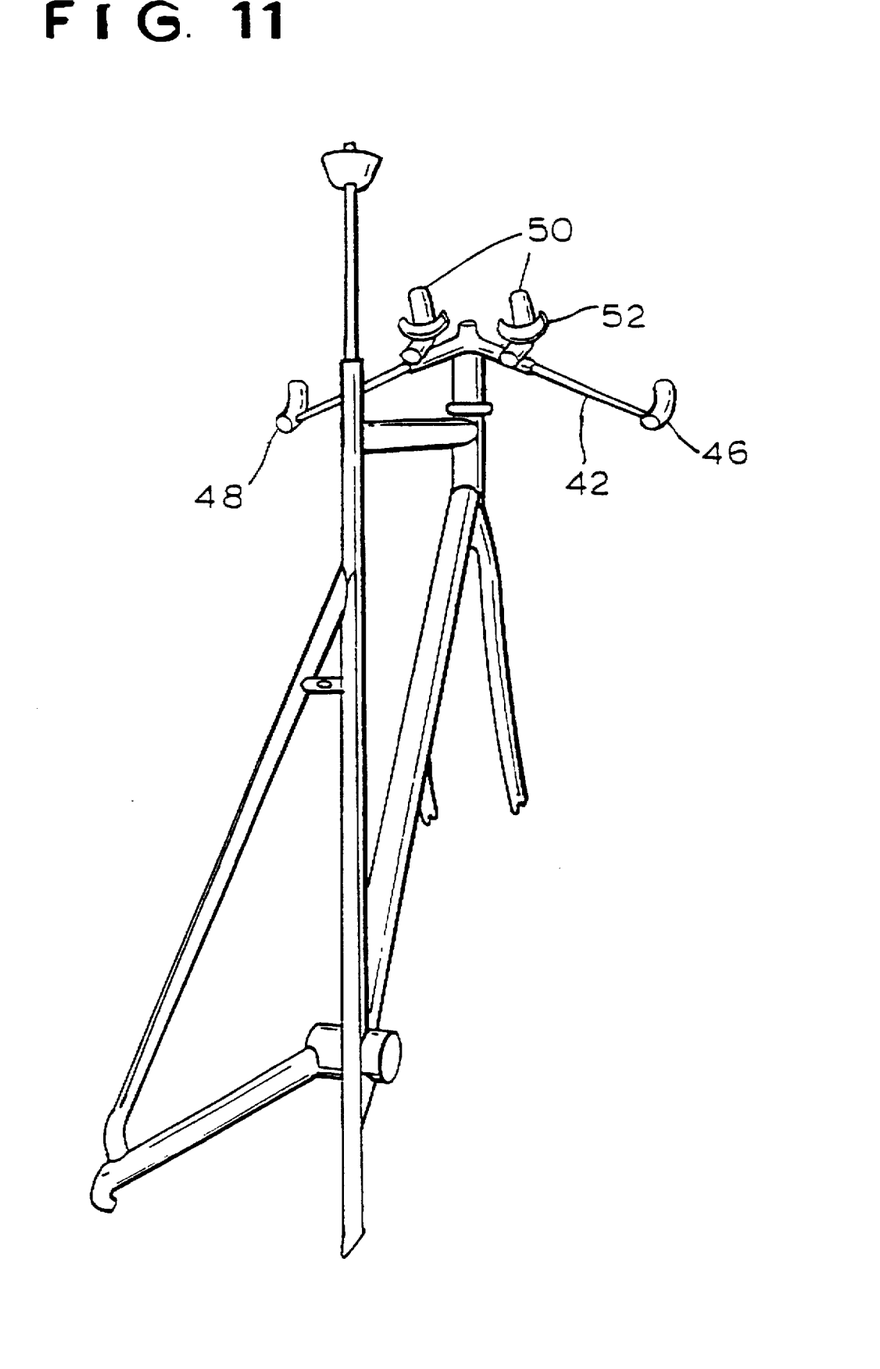
FIG. 11 is a rear perspective view of a bicycle frame including a handlebar having a centerpiece according to the present invention.

FIG. 11 shows a rear perspective view of a bicycle frame 70 equipped with handlebars 40 (FIG. 9) made with the centerpiece 2 of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A centerpiece for a bicycle handlebar, for receiving a pair of separate left and right handlebar sections, the handlebar sections having, in transverse cross-section, a rounded leading edge and a tapered trailing edge, the centerpiece comprising:

left and right lugs having respective elongated mating portions for overlappingly receiving corresponding elongated mating portions of the left and right sections of the handlebar, respectively, each of the lugs having a transverse cross-section having a rounded leading edge and a tapered trailing edge for corresponding to the transverse cross-section of the left and right handlebar sections to be received thereon, respectively.

2. The centerpiece of claim 1, wherein the centerpiece is formed of a metal or metal composite.

3. The centerpiece of claim 1, further comprising a stem extension, the lugs extending from either side of the stem extension.

4. The centerpiece of claim 3, wherein the stem extension is hollow.

5. The centerpiece of claim 3, wherein the stem extension comprises means for connecting the stem extension to a steering post.

6. The centerpiece of claim 3, wherein the left and right lugs extend from either side of the stem extension at a slope angle with respect to a horizontal plane through the stem extension.

7. The centerpiece of claim 6, wherein the slope angle is downward and less than 45°.

8. The centerpiece of claim 3, wherein the left and right lugs extend from either side of the stem extension at a raking angle with respect to a vertical plane transverse to the stem extension.

9. The centerpiece of claim 8, wherein the raking angle is forward and less than 45°.

10. The centerpiece of claim 3, wherein the lugs extend approximately 3–4 inches from an axial center of the stem extension.

11. The centerpiece of claim 3, wherein each of the left and right lugs tapers from a maximum outside dimension adjacent the stem extension to a minimum outside dimension at a point furthest from the stem extension.

12. The centerpiece of claim 3, wherein each of the left and right lugs tapers from a maximum thickness adjacent the stem extension to a minimum thickness at a point furthest from the stem extension.

13. The centerpiece of claim 3, wherein a central axis of the stem extension lies in a horizontal plane.

14. The centerpiece of claim 1, further comprising aerobar supports.

15. The centerpiece of claim 1, wherein the tapered trailing edges of the lugs taper to one of a rounded point or an aerodynamically-tapered point.

16. The centerpiece of claim 1, wherein each of the left and right lugs is shaped so as to provide a smooth transition between the centerpiece and each of the left and right sections of the handlebar.

17. The centerpiece of claim 1, wherein the centerpiece is unitary.

18. The centerpiece of claim 1, wherein the centerpiece is comprised of a single piece of material.

19. The centerpiece of claim 1, wherein the left and right lugs are hollow, the elongated mating portions being formed by elongated inner apertures which have a transverse cross-section having a rounded leading edge and a tapered trailing edge, for receiving therein the left and right sections, respectively.

20. The centerpiece of claim 1, wherein the left and right lugs are substantially solid, the elongated mating portions being formed by elongated outer surfaces which have a transverse cross-section having a rounded leading edge and a tapered trailing edge, for receiving the left and right sections, respectively.

21. A bicycle handlebar assembly comprising:

a centerpiece having left and right lugs having respective elongated mating portions for overlappingly receiving corresponding elongated mating portions of a handlebar, respectively, each of the lugs having a transverse cross-section with a rounded leading edge and a tapered trailing edge, and the handlebar having left and right handlebar sections overlappingly received at the centerpiece lugs and having a transverse cross-section with a rounded leading edge and a tapered trailing edge, the cross-section of the lugs being complementary to the left and right sections, respectively, of the handlebar.

22. The bicycle handlebar assembly of claim 21, wherein a transition between an outside surface of the handlebar and an outside surface of the centerpiece is smooth.

23. The bicycle handlebar assembly of claim 21, further comprising a stem extension.

24. The bicycle handlebar assembly of claim 21, wherein the centerpiece is formed of metal or metal composite.

25. The bicycle handlebar assembly of claim 21, further comprising a stem extension extending from the centerpiece.

26. The bicycle handlebar assembly of claim 21, wherein the assembly is unitary.

27. The bicycle handlebar assembly of claim 21, wherein the assembly is comprised of a single piece of material.

28. The bicycle handlebar assembly of claim 21, wherein the tapered trailing edge of the lugs tapers to one of a rounded point or an aerodynamically-tapered point.

29. The bicycle handlebar assembly of claim 21, wherein each tapered trailing edge of the handlebar sections tapers to one of a rounded point or an aerodynamically-tapered point.

30. The bicycle handlebar assembly of claim 21, wherein each of the handlebar sections is an airfoil.

31. The bicycle handlebar assembly of claim 21, wherein the left and right lugs are substantially solid, the elongated mating portions being formed by elongated outer surfaces which have a transverse cross-section having a rounded leading edge and a tapered trailing edge, for receiving the left and right sections, respectively.

32. The bicycle handlebar assembly of claim 21, wherein the left and right lugs are hollow, the elongated mating portions being formed by elongated inner apertures which have a transverse cross-section having a rounded leading edge and a tapered trailing edge, for receiving therein the left and right sections, respectively.

33. A centerpiece for a handlebar of a bicycle having left and right aerobars, the centerpiece comprising left and right lugs having respective elongated mating portions for overlappingly receiving corresponding mating portions of separate left and right handlebar sections, respectively; the lugs having respective integral left and right aero-bar supports for receiving left and right aerobars, respectively.

34. The centerpiece of claim 33, further comprising a stem extension.

35. The centerpiece of claim 34, wherein the stem extension is hollow.

36. The centerpiece of claim 33, wherein the centerpiece is unitary.

37. The centerpiece of claim 33, wherein the centerpiece comprises a a single piece of material.

38. The centerpiece of claim 33, wherein each of the lugs has a transverse cross-section with a rounded leading edge and a tapered trailing edge for receiving the left and right handlebar sections, respectively, a transverse cross-section of each handlebar section having a rounded leading edge and a tapered trailing edge.

39. The centerpiece of claim 38, wherein the left and right lugs are hollow, the elongated mating portions being formed by elongated inner apertures which have a transverse cross-section having a rounded leading edge and a tapered trailing edge, for receiving therein the left and right sections, respectively.

40. The centerpiece of claim 38, wherein the left and right handlebar sections are separate pieces.

41. The centerpiece of claim 38, wherein each of the tapered trailing edges of the lugs tapers to one of a rounded point or an aerodynamically-tapered point.

42. The centerpiece of claim 38, wherein the left and right lugs are substantially solid, the elongated mating portions being formed by elongated outer surfaces which have a transverse cross-section having a rounded leading edge and a tapered trailing edge, for receiving the left and right sections, respectively.

43. A centerpiece for a bicycle handlebar, for receiving a pair of separate left and right handlebar sections, the handlebar sections having, in transverse cross-section, a rounded leading edge and a tapered trailing edge, the centerpiece comprising:

left and right lugs having respective elongated mating portions for overlappingly receiving corresponding elongated mating portions of the left and right sections of the handlebar, respectively, each of the lugs having a transverse cross-section having a rounded leading edge and a tapered trailing edge for corresponding to the transverse cross-section of the left and right handlebar sections to be received thereon, respectively, and aerobar supports having aerodynamically-tapered trailing ends.

44. A bicycle frame assembly comprising:

a bicycle frame; and a centerpiece assembled with the frame and having left and right lugs having respective elongated mating portions for overlappingly receiving corresponding mating portions of separate left and right sections, respectively, of a bicycle handlebar, each of the lugs having a transverse cross-section with a rounded leading edge and a tapered trailing edge, each handlebar section having a transverse cross-section for corresponding to the cross-section of the lugs.

45. The bicycle frame assembly of claim 44, wherein each of the tapered trailing edges of the lugs tapers to one of a rounded point or an aerodynamically-tapered point.

46. A centerpiece for a handlebar of a bicycle having left and right aerobars, the centerpiece comprising left and right lugs having respective elongated mating portions for overlappingly receiving corresponding mating portions of separate left and right handlebar sections, respectively; the lugs having respective integral left and right aero-bar supports for receiving the left and right aerobars, respectively, wherein the left and right aero-bar supports each have aerodynamically-tapered trailing ends.

* * * * *